United States Patent
Kim et al.

(10) Patent No.: US 10,252,150 B1
(45) Date of Patent: Apr. 9, 2019

(54) METHOD AND SYSTEM FOR TEMPORARILY INCENTIVIZING USER PARTICIPATION IN A GAME SPACE

(71) Applicant: Electronic Arts Inc., Redwood City, CA (US)

(72) Inventors: John Kim, San Francisco, CA (US); Peter Glover, San Francisco, CA (US); Jay Jodway, San Francisco, CA (US); Jay Ambrosini, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 15/627,007

(22) Filed: Jun. 19, 2017

Related U.S. Application Data (63) Continuation of application No. 14/932,886, filed on Nov. 4, 2015, now Pat. No. 9,682,314, which is a continuation of application No. 13/918,580, filed on Jun. 14, 2013, now Pat. No. 9,463,376.

(51) Int. Cl.

| | |
|---|---|
| *A63F 9/24* | (2006.01) |
| *A63F 13/00* | (2014.01) |
| *A63F 13/35* | (2014.01) |
| *A63F 13/46* | (2014.01) |
| *A63F 13/798* | (2014.01) |
| *A63F 13/822* | (2014.01) |

(52) U.S. Cl.
CPC .............. *A63F 13/00* (2013.01); *A63F 13/35* (2014.09); *A63F 13/46* (2014.09); *A63F 13/798* (2014.09); *A63F 13/822* (2014.09)

(58) Field of Classification Search
CPC ......... A63F 13/12; A63F 13/46; A63F 13/798
See application file for complete search history.

(56) References Cited

U.S. PATENT DOCUMENTS

| | | |
|---|---|---|
| 5,816,918 A | 10/1998 | Kelly et al. |
| 5,933,813 A | 8/1999 | Teicher |
| 5,964,660 A | 10/1999 | James |
| 6,142,472 A | 11/2000 | Kliebisch |
| 6,190,225 B1 | 2/2001 | Coleman |
| 6,190,255 B1 | 2/2001 | Thomas |

(Continued)

FOREIGN PATENT DOCUMENTS

| | | |
|---|---|---|
| KR | 10-2013-0137431 | 12/2013 |
| WO | WO 2002/026333 | 4/2002 |

(Continued)

OTHER PUBLICATIONS

"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

(Continued)

*Primary Examiner* — Lawrence S Galka
(74) *Attorney, Agent, or Firm* — Knobbe, Martens, Olson & Bear, LLP (57) ABSTRACT

A system and method for temporarily altering the determination of gameplay metric values in a game space, and distributing awards based on the relative change in gameplay metric values during the temporary time.

20 Claims, 4 Drawing Sheets

(56) References Cited

U.S. PATENT DOCUMENTS

| | | |
|---|---|---|
| 6,306,033 B1 | 10/2001 | Niwa |
| 6,347,996 B1 | 2/2002 | Gilmore |
| 6,402,619 B1 | 6/2002 | Sato |
| 6,561,904 B2 | 5/2003 | Locke |
| 6,604,008 B2 | 8/2003 | Chudley |
| 6,607,437 B2 | 8/2003 | Casey |
| 6,745,236 B1 | 6/2004 | Hawkins |
| 6,811,483 B1 | 11/2004 | Webb |
| 6,811,484 B2 | 11/2004 | Katz |
| 6,850,900 B1 | 2/2005 | Hare |
| 6,928,474 B2 | 8/2005 | Venkatesan |
| 7,050,868 B1 | 5/2006 | Graepel |
| 7,076,453 B2 | 7/2006 | Jam mes |
| 7,136,617 B2 | 11/2006 | Libby |
| 7,156,733 B2 | 1/2007 | ChianQ et al. |
| 7,192,352 B2 | 3/2007 | Walker |
| 7,197,352 B2 | 3/2007 | Walker et al. |
| 7,326,115 B2 | 2/2008 | Baerlocher |
| 7,381,133 B2 | 6/2008 | Thomas |
| 7,455,586 B2 | 11/2008 | Nguyen |
| 7,533,336 B2 | 5/2009 | Jaffe |
| 7,660,740 B2 | 2/2010 | Boone |
| 7,682,239 B2 | 3/2010 | Friedman |
| 7,698,229 B2 | 4/2010 | Hsu |
| 7,749,056 B2 | 7/2010 | Ando |
| 7,785,188 B2 | 8/2010 | Cannon |
| 7,813,821 B1 | 10/2010 | Howell |
| 7,819,749 B1 | 10/2010 | Fish et al. |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster et al. |
| 8,105,156 B2 | 1/2012 | Walker et al. |
| 8,147,340 B2 | 4/2012 | Brunet de Courssou et al. |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf et al. |
| 8,231,470 B2 | 7/2012 | Feeney et al. |
| 8,239,487 B1 | 8/2012 | Hoffman |
| 8,246,439 B2 | 8/2012 | Kelly et al. |
| 8,272,934 B2 | 9/2012 | Olive et al. |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall et al. |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker et al. |
| 8,317,584 B2 | 11/2012 | Aoki et al. |
| 8,317,601 B1 | 11/2012 | Luciano, Jr. |
| 8,323,110 B2 | 12/2012 | Shibamiya et al. |
| 8,328,642 B2 | 12/2012 | Mosites et al. |
| 8,332,260 B1 | 12/2012 | Mysen |
| 8,332,544 B2 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio et al. |
| 8,360,858 B2 | 1/2013 | La Rocca |
| 8,360,866 B2 | 1/2013 | Vanluchene |
| 8,360,867 B2 | 1/2013 | Vanluchene |
| 8,360,868 B2 | 1/2013 | Shvili |
| 8,366,544 B2 | 2/2013 | Walker |
| 8,366,550 B2 | 2/2013 | Herrmann et al. |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett et al. |
| 8,409,015 B2 | 4/2013 | Vanluchene |
| 8,439,759 B1 | 5/2013 | Mello |
| 8,475,262 B2 | 7/2013 | Wolf et al. |
| 8,506,394 B2 | 8/2013 | Kelly et al. |
| 8,512,150 B2 | 8/2013 | Herrmann |
| 8,533,076 B2 | 9/2013 | Chu |
| 8,583,266 B2 | 11/2013 | Herbrich et al. |
| 8,636,591 B1 | 1/2014 | Hawk |
| 8,758,119 B1 | 6/2014 | BronsteinBendayan |
| 8,777,754 B1 | 7/2014 | Santini |
| 8,784,214 B2 | 7/2014 | Parks et al. |
| 8,790,185 B1 | 7/2014 | Caldarone |
| 8,821,260 B1 | 9/2014 | Desanti |
| 8,831,758 B1 | 9/2014 | Chu et al. |
| 8,843,557 B2 | 9/2014 | Ranade |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis et al. |
| 9,007,189 B1 | 4/2015 | Curtis et al. |
| 9,138,639 B1 | 9/2015 | Ernst |
| 9,256,887 B2 | 2/2016 | Santini |
| 9,257,007 B2 | 2/2016 | Santini |
| 9,259,642 B1 | 2/2016 | McNeill |
| 9,286,510 B2 | 3/2016 | Soohoo |
| 9,317,993 B2 | 4/2016 | Hardy |
| 9,375,636 B1 | 6/2016 | Wakeford |
| 9,403,093 B2 | 8/2016 | Harrington |
| 9,406,201 B2 | 8/2016 | Englman |
| 9,452,356 B1 | 9/2016 | Tsao |
| 9,452,364 B1 | 9/2016 | Curtis |
| 9,463,376 B1 | 10/2016 | Kim |
| 9,468,851 B1 | 10/2016 | Pieron |
| 9,610,503 B2 | 4/2017 | Pieron |
| 9,626,475 B1 | 4/2017 | Schultz |
| 9,656,174 B1 | 5/2017 | McLellan |
| 9,669,313 B2 | 6/2017 | Pieron |
| 9,682,314 B2 | 6/2017 | Kim |
| 9,789,407 B1 | 10/2017 | Pieron et al. |
| 9,814,981 B2 | 11/2017 | McLellan et al. |
| 9,873,040 B1 | 1/2018 | Kim et al. |
| 2002/0023039 A1 | 2/2002 | Fritsch |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry et al. |
| 2002/0119824 A1 | 8/2002 | Allen |
| 2002/0165794 A1 | 11/2002 | Ishihara |
| 2002/0183105 A1 | 12/2002 | Cannon et al. |
| 2002/0193162 A1 | 12/2002 | Walker et al. |
| 2003/0008713 A1 | 1/2003 | Ushiro et al. |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii et al. |
| 2003/0216167 A1 | 11/2003 | Gauselmann |
| 2004/0002387 A1 | 1/2004 | Grady |
| 2004/0068451 A1 | 4/2004 | Lenk |
| 2004/0143852 A1 | 7/2004 | Meyers |
| 2004/0199471 A1 | 10/2004 | Hardjono |
| 2004/0215524 A1 | 10/2004 | Parkyn |
| 2004/0224745 A1 | 11/2004 | Bregenzer |
| 2004/0225387 A1 | 11/2004 | Smith, III |
| 2004/0267611 A1 | 12/2004 | Hoerenz |
| 2005/0096117 A1 | 5/2005 | Katz et al. |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0058103 A1 | 3/2006 | Danieli |
| 2006/0063587 A1 | 3/2006 | Manzo |

(56) References Cited

U.S. PATENT DOCUMENTS

| | | |
|---|---|---|
| 2006/0100006 A1 | 5/2006 | Mitchell |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White et al. |
| 2007/0021213 A1 | 1/2007 | Foe et al. |
| 2007/0077988 A1* | 4/2007 | Friedman ............... G07F 17/32 463/25 |
| 2007/0105615 A1 | 5/2007 | Lind |
| 2007/0111770 A1 | 5/2007 | Van Luchene |
| 2007/0129139 A1 | 6/2007 | Nguyen |
| 2007/0129147 A1 | 6/2007 | Gagner |
| 2007/0155485 A1 | 7/2007 | Cuddy et al. |
| 2007/0191101 A1 | 8/2007 | Coliz et al. |
| 2007/0191102 A1 | 8/2007 | Coliz et al. |
| 2007/0213116 A1 | 9/2007 | Crawford et al. |
| 2007/0233585 A1 | 10/2007 | Ben Simon |
| 2007/0281285 A1 | 12/2007 | Jayaweera |
| 2008/0004093 A1 | 1/2008 | Luchene |
| 2008/0032787 A1 | 2/2008 | Low |
| 2008/0058092 A1 | 3/2008 | Schwartz |
| 2008/0076527 A1 | 3/2008 | Low |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo et al. |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0268946 A1 | 10/2008 | Roemer |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano, Jr. et al. |
| 2009/0124353 A1 | 5/2009 | Collette |
| 2009/0204907 A1 | 8/2009 | Finn |
| 2009/0208181 A1 | 8/2009 | Cottrell |
| 2009/0210301 A1 | 8/2009 | Porter |
| 2009/0234710 A1 | 9/2009 | Belgaied Hassine |
| 2009/0280905 A1 | 11/2009 | Weisman |
| 2009/0315893 A1 | 12/2009 | Smith et al. |
| 2010/0022307 A1 | 1/2010 | Steuer et al. |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney et al. |
| 2010/0107214 A1 | 4/2010 | Ganz |
| 2010/0113162 A1 | 5/2010 | Vemuri et al. |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville et al. |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0045898 A1 | 2/2011 | Anderson |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0212756 A1 | 9/2011 | Packard |
| 2011/0218033 A1 | 9/2011 | Englman et al. |
| 2011/0227919 A1 | 9/2011 | Bongio et al. |
| 2011/0250954 A1 | 10/2011 | Braund |
| 2011/0256936 A1 | 10/2011 | Walker et al. |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly et al. |
| 2011/0282764 A1 | 11/2011 | Borst |
| 2011/0300923 A1 | 12/2011 | Van Luchene |
| 2011/0319152 A1 | 12/2011 | Ross |
| 2011/0319170 A1 | 12/2011 | Shimura et al. |
| 2012/0011002 A1 | 1/2012 | Crowe |
| 2012/0015714 A1 | 1/2012 | Ocko et al. |
| 2012/0015715 A1 | 1/2012 | Luxton et al. |
| 2012/0034961 A1 | 2/2012 | Berman et al. |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter et al. |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0202589 A1 | 8/2012 | Kelly |
| 2012/0203669 A1 | 8/2012 | Barsch |
| 2012/0215667 A1 | 8/2012 | Ganz |
| 2012/0221430 A1 | 8/2012 | Naghmouchi |
| 2012/0226573 A1 | 9/2012 | Zakas et al. |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider et al. |
| 2012/0265604 A1 | 10/2012 | Corner |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | Luchene |
| 2012/0295699 A1 | 11/2012 | Reiche |
| 2012/0296716 A1 | 11/2012 | Barbeau |
| 2012/0302329 A1 | 11/2012 | Katz |
| 2012/0302335 A1 | 11/2012 | Gregory-Brown |
| 2012/0309504 A1 | 12/2012 | Isozaki |
| 2012/0311504 A1 | 12/2012 | Van Os et al. |
| 2012/0322545 A1 | 12/2012 | Arnone et al. |
| 2012/0322561 A1 | 12/2012 | Kohlhoff |
| 2012/0329549 A1 | 12/2012 | Johnson |
| 2012/0330785 A1 | 12/2012 | Ham ick et al. |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |

(56) References Cited

U.S. PATENT DOCUMENTS

| | | |
|---|---|---|
| 2013/0006735 A1 | 1/2013 | Koeniqsberq et al. |
| 2013/0006736 A1 | 1/2013 | Bethke |
| 2013/0012304 A1 | 1/2013 | Cartwright |
| 2013/0013094 A1 | 1/2013 | Parks et al. |
| 2013/0013326 A1 | 1/2013 | Miller et al. |
| 2013/0013459 A1 | 1/2013 | Kerr |
| 2013/0029745 A1 | 1/2013 | Kelly et al. |
| 2013/0036064 A1 | 2/2013 | Osvald |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman et al. |
| 2013/0095914 A1 | 4/2013 | Allen |
| 2013/0123005 A1 | 5/2013 | Allen et al. |
| 2013/0124361 A1 | 5/2013 | Bryson |
| 2013/0151342 A1 | 6/2013 | Citron et al. |
| 2013/0173393 A1 | 7/2013 | Calman |
| 2013/0178259 A1 | 7/2013 | Strause et al. |
| 2013/0210511 A1 | 8/2013 | La Rocca |
| 2013/0217453 A1 | 8/2013 | Briggs |
| 2013/0217489 A1 | 8/2013 | Bendayan |
| 2013/0226733 A1 | 8/2013 | Evans |
| 2013/0237299 A1 | 9/2013 | Bancel et al. |
| 2013/0244767 A1* | 9/2013 | Barclay ............... G07F 17/3288 463/25 |
| 2013/0260850 A1 | 10/2013 | Carpe |
| 2013/0288757 A1 | 10/2013 | Guthridge |
| 2013/0288787 A1 | 10/2013 | Yoshie |
| 2013/0290147 A1 | 10/2013 | Chandra |
| 2013/0303276 A1 | 11/2013 | Weston et al. |
| 2013/0303726 A1 | 11/2013 | Mozzarelli |
| 2013/0310164 A1 | 11/2013 | Walker |
| 2013/0324259 A1 | 12/2013 | McCaffrey |
| 2013/0339111 A1 | 12/2013 | Ross |
| 2013/0339228 A1 | 12/2013 | Shuster |
| 2013/0344932 A1 | 12/2013 | Adams et al. |
| 2014/0004884 A1 | 1/2014 | Chang |
| 2014/0011565 A1 | 1/2014 | Elias |
| 2014/0018156 A1 | 1/2014 | Rizzotti et al. |
| 2014/0033262 A1 | 1/2014 | Anders |
| 2014/0038679 A1 | 2/2014 | Snow |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2015/0011305 A1 | 1/2015 | Deardorff |
| 2015/0019349 A1 | 1/2015 | Milley |
| 2015/0031440 A1 | 1/2015 | Desanti |
| 2015/0065241 A1 | 3/2015 | McCarthy |
| 2015/0065256 A1 | 3/2015 | Cudak |
| 2015/0273320 A1 | 10/2015 | Pieron et al. |
| 2015/0306494 A1 | 10/2015 | Pieron |
| 2015/0335995 A1 | 11/2015 | Mclellan |
| 2015/0352436 A1 | 12/2015 | Pieron |
| 2016/0121219 A1 | 5/2016 | Kim |
| 2016/0236094 A1 | 8/2016 | Pieron |
| 2016/0361654 A1 | 12/2016 | Pieron |
| 2017/0326456 A1 | 11/2017 | Kawaguchi et al. |

FOREIGN PATENT DOCUMENTS

| | | |
|---|---|---|
| WO | WO 2013/013281 | 1/2013 |
| WO | WO 2013/059639 | 4/2013 |
| WO | WO 2013/116904 | 8/2013 |
| WO | WO 2015/013373 | 1/2015 |
| WO | WO 2015/153010 | 10/2015 |
| WO | WO 2015/168187 | 11/2015 |
| WO | WO 2015/179450 | 11/2015 |
| WO | WO 2015/196105 | 12/2015 |

OTHER PUBLICATIONS

Super Mario Bros. 3 Review, Nintendo for NES, Feb. 1990, pp. 1-4.

Super Mario Bros. 3, NES Gameplay, http://www.youtube.com/watch?v=82TL-Acm4ts, Published on Mar 14, 2009, 1 page.

Super Mario Bros. 3, StrategyWiki, the video game walkthrough and strategy guide, http://strategywiki.org/wiki/Super_Mario_Bros._3, Oct. 2, 2012, 4 pages.

Profession—WoWWiki—Your guide to the World of Warcraft, URL: http://www.wowwiki.com/Profession, printed Nov. 6, 2012, 8 pages.

TFF Challenge—UC Davis, http://tffohallenge.com/team/uc-davis/, printed Jan. 15, 2014, 13 pages.

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014.<URL:http://war2.warcraft.org/strategy/verybasics/building.shtml>, 3 pages.

"Cataclysm Guide: Guild Advancement—Wowhead", http://www.wowhead.com/guide=cataclysm&guilds, printed Dec. 5, 2013, 4 pages.

City Coins. CityVille Wikia. Online. Accessed via the Internet. Accessed Aug. 9, 2014. <URL:http://cityville.wikia.com/wiki/City_Coins>, 2 pages.

"Clash of Clans". Wikipedia.org. Online. Accessed via the Internet. Accessed Aug. 9, 2014. <URL:http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-riverworld-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

Dreamslayer's Enchanting and Upgrading Guide—With Pictures:D and Explanations, URL: forums.elswordonline.com/Topic5673.aspx [Retrieved Feb. 21, 2013], 10 pages.

Elsword—Wikipedia, the free encyclopedia, URL: en.wikipedia.org/wiki/Elsword [Retrieved Feb. 21, 2013], 6 pages.

Flyff, [dated May 25, 2013]. From Wikipedia, The Free Encyclopedia. [on line], [retrieved on Jan. 12, 2016). Retrieved from the Internet <URL:https://en.wikipedia.org/w/index.php?title=Flyff&oldid=556751091 >. 4 pages.

FriskyMongoose "Happy Island Updates", available Jun. 12, 2012 from https://web.archive.org/N\leb/20120612004417 /http://friskymongoose.com/happy-island-u pdates-new-attractions-decorationsand-limited-edition-item-bundles/, 7 pages.

Gaia "Black Friday Bundle" available on Nov. 23, 2011, from http://www.gaiaonline.com/forum/community-announcements/black-friday-big-bundles-rareitems/t.76127933/, 5 pages.

"Gem calculation formulas", forum.supercell.net. Online. Accessed via the Internet. 99 Accessed Aug. 9, 2014. <URL:http://forum.supercell.net/showthread.php/23028-Gemcalculation-formulas>, 3 pages.

Gem System—Street Fighter X Tekken, http://www.streetfighter.com/us/sfxtk/features/gem-system, printed Nov. 6, 2012, 6 pages.

(56) References Cited

OTHER PUBLICATIONS

"Guild Housing System—FlyFF Wiki", http://flyff-wiki.gpotato.com/wiki/Guild Housing_System, printed Dec. 5, 2013, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://Nvww.business-and-management.org/library/2010/5_ 1--14-29-Hamari,Lehdonvirta.pdf, on May 26, 2015, 16 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
<http://lotro-wiki.com/index.php?title=Ouest:A_Little_Extra_Never_Hurts_--_Part_2&oldid=399366>, <http://lotrowiki.com/index.php?title=Getting_ Started&oldid=349681 >. Links are to used articles. (7 pgs) Feb. 26, 2014.
I don't have enough resources/builders to upgrade anything in my village, what can I do? gamesupport.supercell.nel.12 ::Inline. Accessed via the Internet. Accessed Aug. 9, 2014. <URL:https://gamesupport.supercell.nel/hc/en-us/articles/421482-I-don-t-have-enough-resources-builders-lo-upgrade-anything-in-my-village-what-can-l-do->, Apr. 23, J014, 9 pages.
"Kabam Community Forums> Kingdoms of Camelot> Kingdoms of Camelot Open Discussion>Open Discussion :Tournament of Might Prizes I Main Discussion thread", printed from http://community.kabam.com/forums/archive/index.php/t-43273.html, Oct. 24, 2011, 23 pages.
Katkoff, Michail, "Clash of Clans—the Winning Formula", Sep. 16, 2012, retrieved from Internet on Sep. 30, 2015 from URL<http://www.deconstructoroffun.com/2012/09/clash-of-clans-winning-ormula.html>, 13 pages.
"Lotro-Wiki.com" (evidence in regards to "Lord of the Rings Oline" MMORPG game), latest Dec. 22, 2011, http://lotro-101 Nviki.com/index.php/Main_Page) (hereinafter referred to as Lotro>, http://lotro-wiki.com/index.php?itle=LOTRO_Store&oldid=396550, http://lotro-wiki.com/index.php?title=Ouest:A_Little_Extra_Never_Hurts_--~Part_ 1 &oldid=399597, http://lotro-wiki.com/index.php?title=Ouest:A_Little_Extra_Never_Hurts_--_Part_2&oldid=399366, http://lotro-wiki.com/index.php?title=Getting_Started&oldid=349681, Links are to used articles, 33 pages.
"Lotro-Wiki.com" (evidence in regards to "Lord of the Rings Oline" MMORPG game),latest Dec. 22, 2011,<htlp://lotrowi ki .com/i ndex.ph p/Main _Page )(hereinatter referred to as Lotro>,<http://lotrowiki.com/index.php?itle=LOTRO_Store&oldid=396550>,<http://lotrowiki.com/index.php?title=Ouest:A_Little_Extra_Never_Hurts_--_Part_1 &oldid=399597> (28 pgs).
MapleStory—Guides—Equipment Upgrading 101: Enhancements, URL: maplestory.nexon.net/guides/game-play/systems/OOFlk; [Retrieved Jun. 24, 2013] 3 pages.
MapleStory—Guides—Equipment Upgrading 101: Potentials, URL:maplestory.nexon.net/guides/game-play/systems/OOFIj/ [Retrieved Jun. 24, 2013], 5 pages.
MapleStory—Guides—Equipment Upgrading 101: Scrolls, URL:maplestory.nexon.net/guides/game-play/systems/OOFFV/#mitigating [Retrieved Jun. 24, 2013], 4 pages.
MMO Site "Rose Online Launches the Newest in Game Feature"; available Aug. 11, 2011 from https://web.archive.org/Nveb/20110811231226/htlp://news.mmosite.com/content/2011-06-21/rose_online_launches_the_newest_in_game_feature.1.shtml, 3 pages.
New Feature: Tiered Tournaments and Tournament Updates, printed from http://community.kabam.com/forums/showthread.php?171349-New-Feat on Feb. 11, 2014, 2 pages.
Ozeagle, "What happens if . . . answers about account types" on Lotro forum, Jan. 18, 2011 , <https://www.lotro.com/foru ms/showth read. php?377885-What-happens-if-answers-about-the-account-types> (16 pgs).
Path of Exile, Internet posting: http://web.archive.org/web/20120606004658/http://www.pathofexile.com/forum/view-thread/12056, Nov. 16, 2011, 52 pages.
Quest item—WoWWiki—Your guide to the World of Warcraft <URL:http://www.wowwiki.com/Quest Item> Retrieved on Apr. 16, 2014, 1 page.
"Rest—WoWWiki—Your guide to the World of Warcraft", printed from http://www.wowwiki.com/Rest, May 19, 2014, 2 pages.
"Scroll of Amplification R", [dated Apr. 26, 2012]. From flyff-wiki. [online], [retrieved on Jan. 12, 2016]. Retrieved from the Internet <URL:http://flyff-wiki.webzen.com/wiki/Scroll_of_Amplification_R>. 3 pages.
TFWiki "teamfortress wiki" available Nov. 5, 2011 retrieved from https://web.archive.org/web/20111105044256/http://wiki.teamfortress.com/wiki/Loadout, 4 pages.
The Arreat Summit—Items: Basic Item Information, URL: web.archive.org/~eb/20090323171356/http://classic.battle.net/diablo2exp/items/basics.shtml[Retrieved Feb. 21, 2013], 3 pages.
UBC, "Theory of Auctions" available on Mar. 24, 2012 from https://web.archive.org/web/2012032420461O/http:/montoya.econ.ubc.ca/Econ522/auctions.pdf, slide 5, Para. 1.3, 19 pages.
"Warcraft II: Tides of Darkness". Wikipedia.org. Online. Accessed via the Internet. Accessed Aug. 9, 2014. <URL:http://en.wikipedia.org/wiki/Warcraft_II:_Tides_of_Darkness>, 10 pages.
Wiki "Gaia online"', available on Sep. 9, 2011, https://web.archive.org/web/20110927210155/http://en.wikipedia.org/wiki/Gaia_Online, 8 pages.
Wikipedia, Mafia Wars, <http://en.wikipedia.orq/wiki/Mafia Wars>, Jan. 28, 2012, 3 pages.
PCT International Search Report and Written Opinion for PCT/US2016/017637 dated Apr. 7, 2016, 12 pages.
"A Wondrous Drop Event and Double EXP", [dated Aug. 22, 2012]. From flyff-wiki. [online], [retrieved on Jan. 12, 2016]. Retrieved from the Internet <URL:http://flyff-wiki.webzen.com/wiki/A_Wondrous_ Drop_Event_and_Double_EXP>. 2 pages.
Diablo 2, Blizzard Entertainment, Mar. 23, 2009, manual and online website, http://web.archive.Org/web/20090323171356/http:l/classic.battle.net/diablo 2exp/items/basics.shtml, 51 pages.
Elsword, Dec. 27, 2007, Kog Studios, Guide posted Mar. 17, 2011, http:// forums.elswordonline.com/topic5673.aspx,http://en.wikipedia.org/wiki/Elsword, 16 pages.
"Getting Started" written by BoD, published on Oct. 13, 2011 and printed from URL <http://lotrowiki.com/index.php?title=Getting_Started&oldid=349681 >, 5 pages.
"Lotro Store" written by Elinnea, published on Dec. 15, 2011 and printed from URL <http://lotrowiki.com/index.php ?title=LOTRO _ Store&oldid=396550>, 23 pages.
Main Page written by Starbusty, published on Dec. 12, 2011 and printed from URL <http://lotrowiki.com/index.php?title=Main_Page&oldid=394429>, 2 pages.
MapleStory, Internet guide: http://maplestory.nexon.net/gu ides/game-play/systems/OOFIk/, http://maplestory.nexon.net/guides/game-play/systems/OOFIk, http://maplestory.nexon.net/guides/game-play/systems/OOFFV, Sep. 28, 2012, 12 pages.
Path of Exile—Forum—Beta General Discussion—Unique Items Compendium 60/71 URL:web. archive .o rg/web/20120608004658/http://www. path of exile .co m/fo rum/view-thread/ 12056 [Retrieved Jun. 24, 2013], 52 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_--_Part_ 1&oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_--_Part_2&oldid=399366>, 2 pages.

\* cited by examiner

METHOD AND SYSTEM FOR TEMPORARILY INCENTIVIZING USER PARTICIPATION IN A GAME SPACE

FIELD OF THE DISCLOSURE

This disclosure relates to altering an achievement gameplay metric during an event period such that gameplay metric values that are associated with user achievements are magnified during the event period. This disclosure further relates to distributing awards to users with the greatest relative increase in the gameplay metric values during the event period.

BACKGROUND

Events in which users of online games are encouraged (e.g., through prizes, etc.) to progress with respect to one or more metrics are known. For example, in a given event, users may be encouraged to achieve an increase in one or more of might, experience points, a harvested resource, training of one or more troop types, and/or other metrics. Such events generally provide users with a reason to spend money on virtual items usable in an online game to achieve an increase in the appropriate metric(s).

SUMMARY

One aspect of the disclosure relates to a system configured to provide a game space, in accordance with one or more implementations. Users of a game space may encounter achievements during the use of game space. The game space may use gameplay metrics to track the completion of achievements and/or other activities in the game space. The game space may do this by associating values for game play metrics for each user. In some implementations, the values of a gameplay metric determined for users (or, "gameplay metric values"), may be magnified to temporarily encourage the completion of achievements and/or other activities within the game space. In some implementations, the system may include one or more servers. The server(s) may be configured to communicate with one or more client computing platforms according to a client/server architecture. The users may access the system and/or the game spaces via the client computing platforms, in for instance, one or more games.

The server may be configured to execute one or more computer program modules. The computer program modules may include one or more of a game module, a scoring module, an event scoring module, an event evaluation module, an award distribution module, a user module, a store module, and/or other modules.

The game module may be configured to execute an instance of a game space. The game module may be configured to implement the instance of the game space to facilitate participation by users in a game within the game space. The instance of the game space may be used to facilitate presentation of views of the game space to users on the client computing platforms associated with the users.

The instance of the game space may comprise one or more user achievements. Achievements may include performing in-game actions, completing in-game missions and/or quests, interacting with other users, and/or other activities.

The scoring module may be configured to determine gameplay metric values of a gameplay metric for users. The instance of the game space may comprise a gameplay metric algorithm used to determine gameplay metrics associated with user achievements. Each user may be associated with a metric so that each user has a gameplay metric value. The gameplay metric algorithm may depend on the conditions of the game space. Individual users of a game space may be associated with one or more gameplay metric values quantifying the user's achievement in the game space.

The event scoring module may be configured to alter the determinations of gameplay metrics. In some instances of the game space, altering the determination of gameplay metrics magnifies the impact of achievement. In some instances, users will benefit from completing achievements during the temporary period as compared to completing achievements during a non-incentivized period by temporarily modifying the determination of said gameplay metrics to incentivize gameplay during a temporary period.

The event evaluation module may be configured to determine, based on the magnified gameplay metric values determined for users of a game space, users who achieve the greatest increase in at least a category of gameplay metric. The evaluation module may generate rankings for only the top users, all users, a group of users, and/or other sets of users of the game space.

The award distribution module may be configured to distribute awards to users determined to possess the greatest increase in at least a category of gameplay metric. Awards may be predetermined based on one or more of ranking, tiers of gain in the gameplay metric, etc.

The user module may be configured to track the activity of users. The user module may generate a profile for each user of the game space. The user profiles may include, for example, information identifying users (e.g., a username or handle, a number, an identifier, and/or other identifying information) within the game space, security login information (e.g., a login code or password), game space account information, subscription information, virtual currency account, user inventory, and/or other information.

A store module may be configured to present a store interface to the users. The store interface may present offers to users to buy item instances of virtual items and/or power-ups. The virtual items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
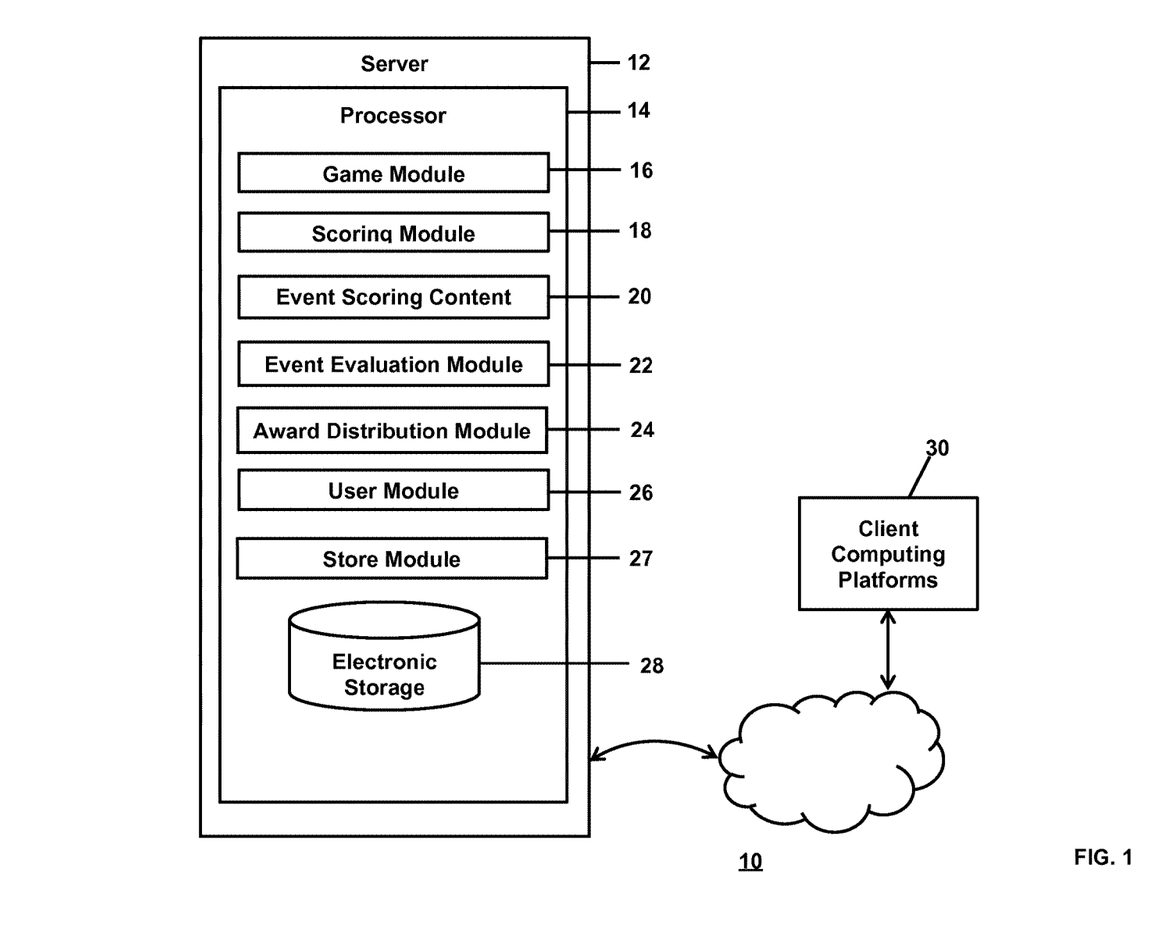
FIG. 1 illustrates a system configured to provide a game space, in accordance with one or more implementations.

FIG. 1 illustrates a system 10 configured to provide a game space to users. Providing the game space may include hosting the game space over a network. In some implementations, system 10 may include a server 12. Server 12 may be configured to communicate with one or more client computing platforms 30 according to a client/server architecture. Users may access system 10 and/or the game space via client computing platforms 30.

The server 12 may be configured to execute one or more computer program modules. The computer program modules may include one or more of a game module 16, a scoring module 18, an event scoring module 20, an event evaluation module 22, an award distribution module 24, a user module 26, a store module 27, and/or other modules.

Game module 16 may be configured to implement an instance of the game space executed by the computer modules. In some cases, the instance of the game space may reflect the state of the game space. The instance of the game space may be used to push state information to clients (e.g., client computing platforms 30) for implementation on the client, may be used to verify state information generated on client executing expressions of the instance locally, and/or for other purposes. State information may include information about the state of the game space such as, without limitation, position information of one or more objects, topography information, object status/shape information, battle information, score information, user or character progress information, user inventory information, user or character resource information, progress information for one or more activities or actions, view information describing a view of the game space, and/or other information that describes the state of the game space. Expressions of the instance executed on the client facilitate presentation of views on the client of the game space. Expressions of the instance executed on the client may be configured to simply present views of the game space based on the state information (e.g., via streaming view information, object/position information, and/or other state information) received from game module 16. Expressions of the instance executed on the client may include space logic that effectively provides for execution of a limited version of the instance on a client that is synchronized and/or verified with state information received from game module 16. The view presented on a given client may correspond to a location in the game space (e.g., the location from which the view is taken, the location the view depicts, and/or other locations), a zoom ratio, a dimensionality of objects, a point-of-view, and/or view parameters. One or more of the view parameters may be selectable by the user.

The instance of the game space may comprise a simulated space that is accessible by users via clients that present the views of the game space to a user. The simulated game space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the game space may also comprise one or more user achievements. In a game space such as an online game, a user achievement may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, defeating an enemy or enemies, rescuing an ally or allies, completing a mission or quest, and/or other actions. For example, in a game space involving building virtual structures, a user achievement may be associated with building, upgrading, and/or repairing a building or buildings. In another example involving a game space with an aspect related to the development of a character, a user achievement may be associated with using melee attack or a spell; interacting with another player and/or a non-player character; defeating an enemy or enemies; and/or rescuing an ally or allies. In yet another example involving a game space with an aspect related to the development of an army, a user achievement may be associated with winning a battle, developing an army to a certain size, and/or sustaining a minimal number of losses during a battle.

In some cases, a user achievement may comprise completing a plurality of sub-achievements. In addition, a person of skill in the art will appreciate the requirements for a game space achievement may be static or dynamic depending on the conditions of the game space. For instance and without limitation, the requirements for an achievement may depend on the number of other players attempting the same achievement and/or other conditions.

A person of skill in the art will further appreciate that, in some instances, the requirements for obtaining an achievement may be augmented through the use of in-game power-ups. In-game power-ups may include, for example, a skill boost, an attribute boost, a damage multiplier, a healing buff, an item, a spell, and/or other power-ups. In-game power-ups may be acquired by making an in-game purchase, using real or virtual currency, defeating an enemy, assisting an ally, trade with other users, trade with a non-player character, discovering an item, discovering a resource, and/or other methods of acquiring power-ups. The embodiments described are not intended to be limiting.

Within the instance of the game space executed by game module 16, users may control characters, objects, simulated physical phenomena (e.g., wind, rain, earthquakes, and/or other phenomena), and/or other elements within the game space to interact with the game space and/or each other. The user characters may include avatars. As used herein, the term "user character" may refer to an object (or group of objects) present in the game space that represents an individual user.

The user character may be controlled by the user with which it is associated. The user controlled element(s) may move through and interact with the game space (e.g., non-user characters in the game space, other objects in the game space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game space.

The users may participate in the instance of the game space by controlling one or more of the available user controlled elements in the game space. Control may be exercised through control inputs and/or commands input by the users through client computing platforms 30. The users may interact with each other through communications exchanged within the game space. Such communications may include one or more of textual chat, instant messages, private messages, voice communications, and/or other communications. Communications may be received and entered by the users via their respective client computing platforms 30. Communications may be routed to and from the appropriate users through server 12 (e.g., through game module 16).

The above description of the views of the game space determined from the instance executed by game module 16 is not intended to be limiting. The game space may be presented in a more limited, or more rich, manner. For example, views of the game space may be selected from a limited set of graphics depicting an event in a given place within the game space. The views may include additional content (e.g., text, audio, pre-stored video content, and/or other content) that describes particulars of the current state of the place, beyond the limited set of graphics. For example, a view may include a generic battle graphic with a textual description of the opponents to be confronted. Other representations of individual places within the game space are contemplated.

A scoring module 18 may be configured to determine gameplay metrics associated with user achievement in the game space. In some instances, gameplay metrics may be used to quantify a user's achievements and/or progress in the game space. A person of skill in the art will appreciate that a gameplay metric is a type of measurement in the game space. A person of skill in the art will further appreciate that a gameplay metric value is a value of the measurement that may be associated with, for example, the benefit accorded to a gameplay metric for completing an achievement, the summation of a user's history with respect to a gameplay metric, and/or other uses. In some instances, for example, as a game space user completes achievements in the game space, gameplay metric values associated with the completed achievements are added to the total gameplay metric values for the user, with respect to the gameplay metrics that relate to the achievements. Thus, a person of skill in the art will appreciate that a user's achievements and/or progress in the game space may be associated with one or more gameplay metric values for the user. A person of skill in the art will further appreciate that a user of a game space may be associated with one or more gameplay metrics.

Gameplay metrics may represent types of acts in the game space and/or they may represent a measure of progression. For example, in some instances, gameplay metrics may measure total enemies defeated, total allies saved, total buildings created, total resources discovered, total area of map revealed, total experience, total might, total reputation, total influence, and/or other measurements. A single achievement may cause the user to accumulate points in various gameplay metrics. In one instance, for example, a user who defeats an enemy may gain a point for the gameplay metrics associated with that achievement, such as total enemies defeated, total experience, total might, and total reputation. Therefore, the gameplay metric values for the user will be incremented by one point. As described above, a gameplay metric is a type of measurement of a type of action in the game space and/or a measure of progression; a gameplay metric value is the value of the metric, which may correspond to a number of points relating to an achievement and/or the number of points accumulated by a user.

In yet other implementations, gameplay metric values may be determined based on one or more of log in frequency, amount of time logged in to the game space within a rolling time period (e.g., over the last day, week, month, or other rolling time period), average amount of time logged in to the game space over some length of time (e.g., per day, per week, and/or other length of time), average log in session time over a rolling time period, number of inter-user communications over a length of time, number of inter-user communications per log in, number of relationships with other users in the game space, number of new relationships with other users in the game space within a rolling time period, amount of real world money spent in the game space, amount of missions and/or quests accomplished, amount of enemies killed, amount of allies rescued, and/or other activity parameters.

The scoring module 18 may be configured to monitor interactions of the users with the game space and/or each other within the game space. This may include monitoring, for a given user, areas of the game space the given user views or interacts with or in, other users the given user interacts with, the nature and/or content of interactions of the given user with other users, activities participated in within the game space, level, powers, or skill attained in the game space, inventory items obtained in the game space, and/or other interactions of the given user with the game space and/or other users. Some or all of the information generated by scoring module 18 in monitoring the interactions of the users may be stored to the user profiles managed by user module 26.

A person of skill in the art will appreciate that the scoring module may use a gameplay metric algorithm to determine gameplay metric values associated with users' achievements. The gameplay metric may use factors to determine the gameplay metric values associated with achievements; such factors may include a user's existing gameplay metric values, a difficulty level, and/or other factors.

An event scoring module 20 may be configured to alter the determination of the gameplay metric values determined by scoring module 18. In some implementations, it may be advantageous to modify the gameplay metric values determined by scoring module 18 for a temporary period of time. The period of time may correspond with a game space event. A game space event may include, for example, a tournament, a holiday, a party, a celebration, and/or other events. In some instances, it may be a goal of the game space event to encourage user participation.

In one implementation, event scoring module 20 may alter the determination of the gameplay metric values determined by scoring module 18 so that they are double their unaltered amount in relation to the same achievement. In this manner, users of a game space may derive a benefit from completing achievements during the temporary period of time because an achievement will correspond to greater gameplay metric values than had the achievement been completed outside the temporary period of time. A person of skill in the art will appreciate that the modified gameplay metric values may be triple the unaltered value, quadruple the unaltered value, the unaltered value plus a fixed value, the unaltered value plus a variable value, and/or other modifications to the normal gameplay metric value.

In other implementations, event scoring module 20 may alter the gameplay metric values determined by scoring module 18 such that the alteration varies based other factors such as the existing gameplay metric values of a user, the time left in the temporary period, and/or other factors. For example, in one instance, event scoring module 20 may triple the gameplay metric values associated with the accomplishment of an achievement for users with gameplay metric values below a specified threshold, and it may double the gameplay metric values associated with the accomplishment of an achievement for users with gameplay metric values above the specified threshold. Conversely, event scoring module 20 may double the gameplay metric values associated with an achievement for users with gameplay metric values below a specified threshold, and it may triple the gameplay metric values associated with an achievement for users with gameplay metric values above the specified threshold. These implementations are not intended to be limiting.

An event evaluation module 22 may be configured to determine, based on the relative increases in users' gameplay metric values during the temporary period, a user who achieves the greatest increase in a gameplay metric. In instances where a user is associated with multiple gameplay metrics, event evaluation module 22 may be configured to determine a user who achieves the greatest increase in a category of gameplay metrics and/or the greatest overall increase amongst all gameplay metrics and/or categories of gameplay metrics.

In some instances, event evaluation module 22 may determine multiple users that achieve the greatest increase in a category of gameplay metrics such that a user with the greatest increase is ranked 1st, a user with the second greatest increase is ranked 2nd, and a user with the third greatest increase is ranked 3rd. A person of skill in the art will appreciate that this event evaluation module 22 is not limited to ranking the top 3 users of the game space. In other instances, event evaluation module 22 may determine, for example, the user with the greatest increase in a category of gameplay metrics, the ranking of the 10 users with the greatest increase in a category of gameplay metric values, the ranking of the 100 users with the greatest increase in a category of gameplay metric values, the ranking of all users for a category of gameplay metric values, and/or other numbers of rankings. A person of skill in the art will also appreciate that in a game space involving competing teams, factions, guilds, and/or other groupings, event evaluation module 22 may determine rankings such that the groupings are ranked in relation to each other and/or such that the members of the groupings are ranked in relation to the other members of the same grouping.

The award distribution module 24 may be configured to distribute awards to users identified by event evaluation module 22. Award distribution module 24 may distribute various types of awards such as in-game items, virtual currency, real currency, real items, in-game power-ups, bonuses to gameplay metrics, and/or other awards. The distribution may be made through various delivery channels such as in-game mail, in-game transfer, email, physical mail, physical delivery, and/or other channels.

The user module 26 may be configured to access and/or manage one or more user profiles and/or user information associated with users of the system 10. The one or more user profiles and/or user information may include information stored by server 12, one or more of the client computing platforms 30, and/or other storage locations. The user profiles may include, for example, information identifying users (e.g., a username or handle, a number, an identifier, and/or other identifying information) within the game space, security login information (e.g., a login code or password), game space account information, subscription information, virtual currency account information (e.g., related to currency held in credit for a user), relationship information (e.g., information related to relationships between users in the game space), game space usage information, demographic information associated with users, interaction history among users in the game space, information stated by users, purchase information of users, browsing history of users, a client computing platform identification associated with a user, a phone number associated with a user, and/or other information related to users.

A store module 27 may be configured to present a store interface to the users. The store interface may present offers to users to buy item instances of virtual items and/or power-ups. The virtual items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store module 27 may be configured to effectuate presentation to the users of offers to purchase resources. The offers may include a first offer for the first user to purchase a first set of one or more virtual items. The virtual items may include a virtual good, a virtual currency, and/or other virtual items as described above. For example, the store module 27 may be configured such that the offers presented to the first user may be restricted to offers having prices in a first price range. The first price range may be determined based on the user metric for the first user, and/or the user metric for other users. The store module 27 may be configured such that the first price range may change as participation by the first user in the game causes the user metric for the first user to change. The store module 27 may be configured such that the first price range may be bounded by one or more both of a minimum value and/or a maximum value. The store module 27 may be configured such that the offers having prices below the minimum value may not be available for purchase by the first user. The store module 27 may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

In some implementations, the server 12 and client computing platforms 30 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12 and client computing platforms 30 may be operatively linked via some other communication media.

A given client computing platform 30 may include one or more processors configured to execute computer program modules. The computer program modules may be configured to enable an expert or user associated with the given client computing platform 30 to interface with server 12, and/or provide other functionality attributed herein to client computing platforms 30. By way of non-limiting example, the given client computing platform 30 may include one or more of a desktop computer, a laptop computer, a handheld computer, a tablet computing platform, a NetBook, a Smartphone, a gaming console, and/or other computing platforms.

Server 12 may include electronic storage 28, one or more processors 14, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 28 may comprise non-transitory storage media that electronically stores information. The electronic storage media of electronic storage 28 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 14, information received from server 12, information received from client computing platforms 30, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include a plurality of processing units. These processing units may be physically located within the same device, or processor 14 may represent processing functionality of a plurality of devices operating in coordination. The processor 14 may be configured to execute modules 16, 18, 20, 22, 24, 26, and 27. Processor 14 may be configured to execute modules 16, 18, 20, 22, 24, 26, and 27 by software; hardware; firmware; some combination of software, hardware, and/or firmware; and/or other mechanisms for configuring processing capabilities on processor 14. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 16, 18, 20, 22, 24, 26, and 27 are illustrated in FIG. 1 as being implemented within a single processing unit, in implementations in which processor 14 includes multiple processing units, one or more of modules 16, 18, 20, 22, 24, 26, and 27 may be implemented remotely from the other modules. The description of the functionality provided by the different modules 16, 18, 20, 22, 24, 26, and 27 described below is for illustrative purposes, and is not intended to be limiting, as any of modules 16, 18, 20, 22, 24, 26, and 27 may provide more or less functionality than is described. For example, one or more of modules 16, 18, 20, 22, 24, 26, and 27 may be eliminated, and some or all of its functionality may be provided by other ones of modules 16, 18, 20, 22, 24, 26, and 27. As another example, processor 14 may be configured to execute one or more additional modules that may perform some or all of the functionality attributed below to one of modules 16, 18, 20, 22, 24, 26, and 27.

Figure 2:
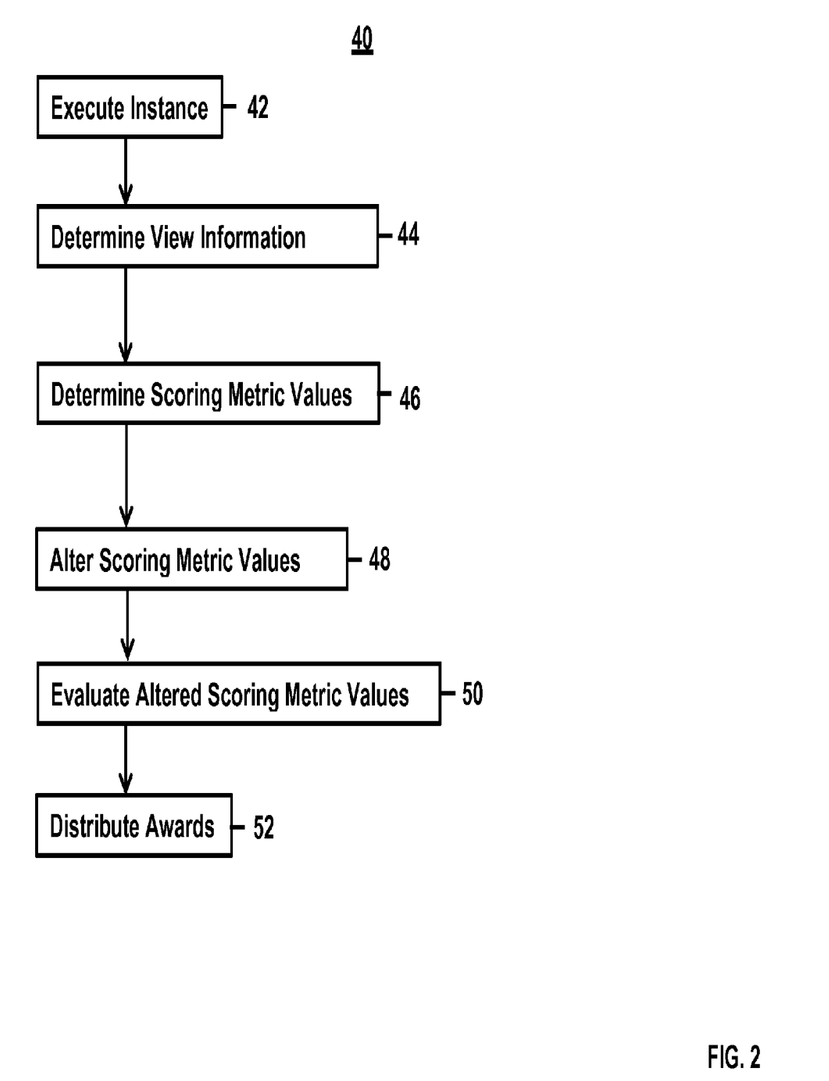
FIG. 2 illustrates a method of hosting a game space to client computing devices for interaction by users.

FIG. 2 illustrates a method 40 of hosting a game space to client computing devices for interaction by users. The operations of method 40 presented below are intended to be illustrative. In some embodiments, method 40 may be accomplished with one or more additional operations not described, and/or without one or more of the operations discussed. Additionally, the order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a game space may be executed. Operation 42 may be performed by a game module that is the same as or similar to game module 16, in accordance with one or more implementation.

At an operation 44, view information may be determined from the executed instance of the game space. The view information may define a view of the game space for presentation to a user. Operation 44 may be performed by a module that is the same as or similar to game module 16, in accordance with one or more implementation.

At an operation 46, gameplay metric values for users may be determined. Operation 46 may be performed by a module that is the same as or similar to scoring module 18, in accordance with one or more implementation.

At an operation 48, the gameplay metric values may be altered. Operation 48 may be performed by a module that is the same as or similar to event scoring module 20, in accordance with one or more implementation.

At an operation 50, the altered gameplay metric values may be evaluated. Operation 50 may be performed by a module that is the same as or similar to event scoring module 22, in accordance with one or more implementation.

At an operation 52, awards may be distributed. Operation 52 may be performed by a module that is the same as or similar to award distribution module 24, in accordance with one or more implementation.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 3:
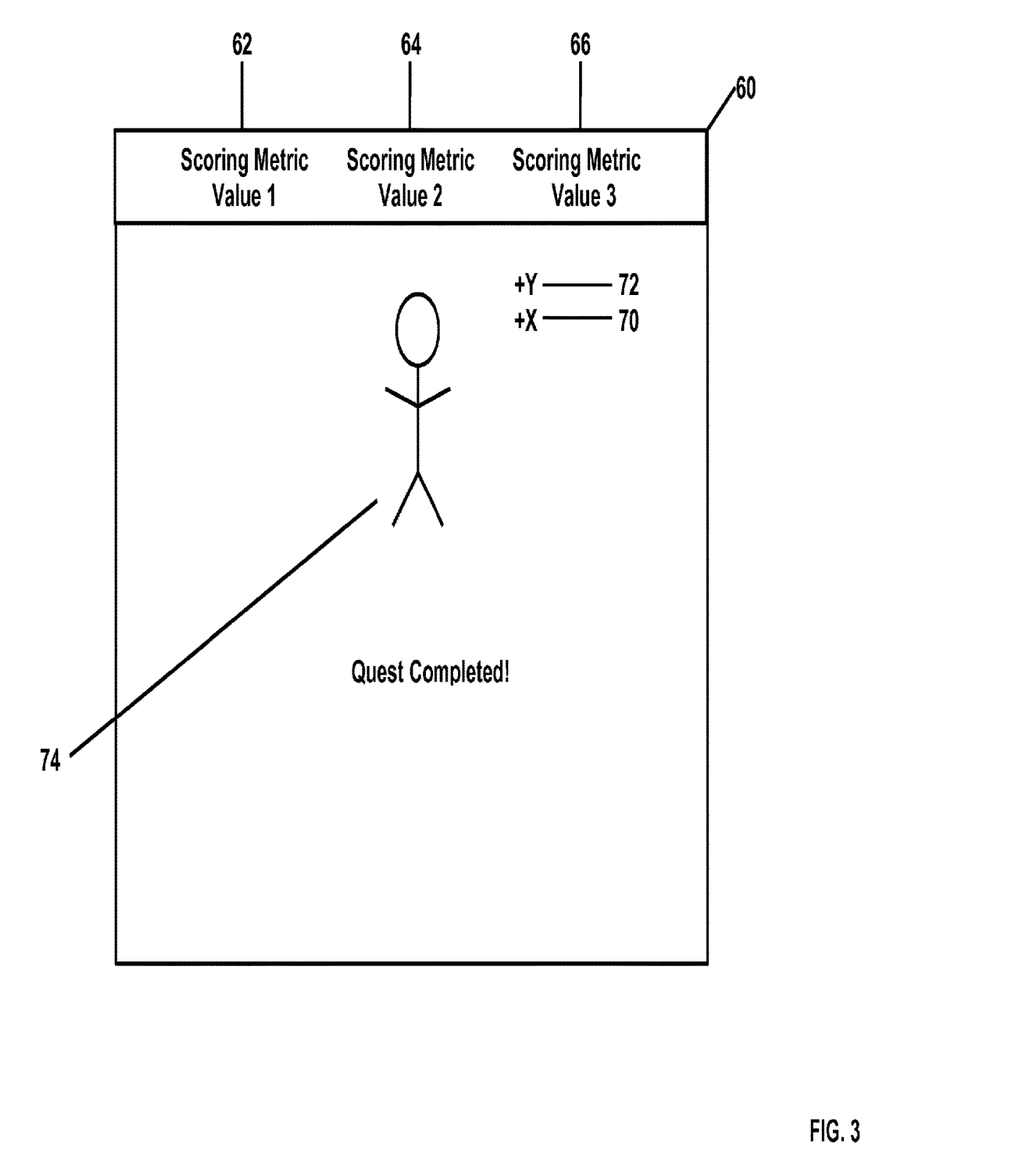
FIG. 3 illustrates a view of a game space where a user completes an achievement during a non-event period.

FIG. 3 illustrates an embodiment of game space interface 60 after a user has completed an achievement during a non-event period. Game space interface 60 may be configured to display a game space 74. Game space interface 60 may be configured to display a plurality of gameplay metric values associated with a user 62, 64, and 66. Upon a user's accomplishment of an achievement, game space interface 60 may be configured to display gameplay metric values associated with the accomplishment of an achievement during a non-event period 70 and 72.

Figure 4:
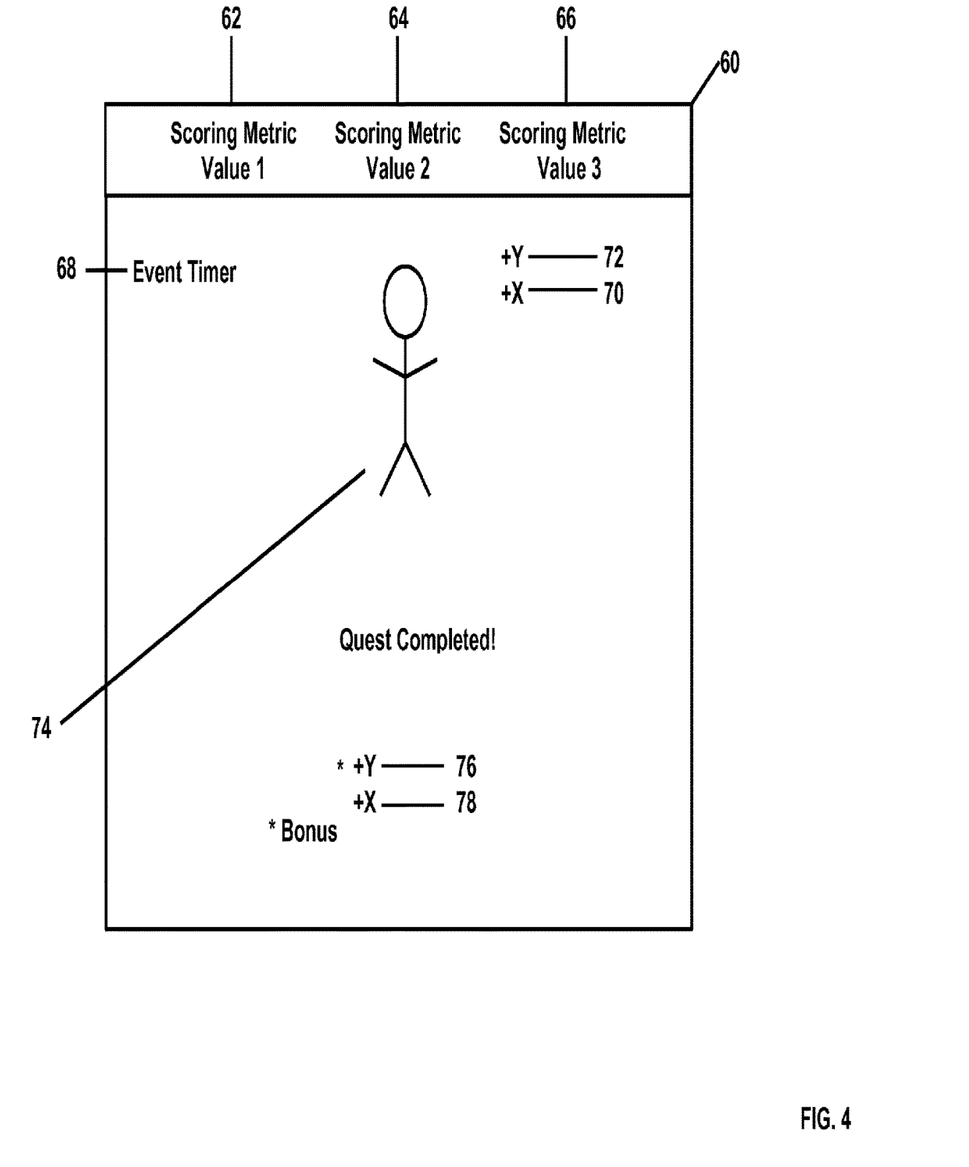
FIG. 4 illustrates a view of a game space where a user completes an achievement during an event period.

FIG. 4 illustrates an embodiment of game space interface 60 after a user has completed an achievement during an event period. Game space interface 60 may be configured to display a game space 74. Game space interface 60 may be configured to display a plurality of gameplay metric values associated with a user 62, 64, and 66. Game space interface 60 may also be configured to display event time 68 showing the amount of time remaining in the event period. Upon a user's accomplishment of an achievement, game space interface 60 may be configured to display gameplay metric values associated with the accomplishment of an achievement during a non-event period 70 and 72, as well as additional gameplay metric values corresponding to the same achievement, that are awarded to the user for accomplishing the achievement during the event period 76 and 78.

What is claimed is:

1. A system for providing offers in a game space, the system comprising:
one or more processors configured by machine-readable instructions to:
execute an instance of a shared game space that is common to users, and to implement the instance to facilitate presentation of views of the shared game space to users, wherein the shared game space is configured to facilitate interaction of the users with the shared game space and/or each other by performing operations in the shared game space in response to commands received from the users, wherein a first user is associated with a first user grouping comprising a plurality of users;
determine gameplay metric values of a gameplay metric for the users, wherein the gameplay metric values quantify achievement within the shared game space such that a first gameplay metric value determined for the first user quantifies achievement of the first user in the shared game space;
alter determinations of the gameplay metric values during an event time period to magnify changes to the gameplay metric values, wherein, during the event time period, the determination of the gameplay metric values is altered to magnify the changes to the gameplay metric values such that the impact of achievement in the shared game space is magnified;
determine, based on increases in the gameplay metric values of the users during the event time period, a ranking of the first user grouping; and
determine, based on the ranking of the first user grouping, awards to be provided to the individual users of the first user grouping, wherein the awards include virtual items to be distributed for use in the shared game space such that a first award is determined to be provided to a first user based on the ranking of the first user grouping during the event time period.

2. The system of claim 1, wherein the one or more processors are further configured by machine-readable instructions such that the determination of the gameplay metric is reverted to its unaltered state after the event period.

3. The system of claim 1, wherein the gameplay metric includes a type of measurement of a type of action in the shared game space and/or a measure of progression, and wherein the gameplay metric values indicates value of the gameplay metric and includes a number of points relating to an achievement and/or the number of points accumulated by a user.

4. The system of claim 1, wherein the one or more processors are further configured by machine-readable instructions such that, during the event period, the determination of the gameplay metric values associated with achievements for a first user are altered to magnify the impact of the achievements such that the gameplay metric values are different than if the achievements occurred outside the event period.

5. The system of claim 1, wherein the one or more processors are further configured by machine-readable instructions to determine an award for each of multiple categories of gameplay metric values to be distributed to the users with the greatest increase in each of the multiple categories of gameplay metric values.

6. The system of claim 1, wherein the one or more processors are further configured by machine-readable instructions to determine multiple awards for a single category of gameplay metric values, and multiple users are provided awards based on their increase in the single category of gameplay metric values.

7. The system of claim 1, wherein the one or more processors are further configured by machine-readable instructions to differentially alter the determination of the gameplay metric values of a first user responsive to the first user purchasing an in-game benefit.

8. The system of claim 1, wherein the one or more processors are further configured by machine-readable instructions to distribute at least an award.

9. A computer implemented method for providing offers in a game space, the method being implemented in a computer system that includes one or more processors configured by machine-readable instructions, the method comprising:

executing an instance of a shared game space that is common to users, and implementing the instance to facilitate presentation of views of the shared game space to users, wherein the shared game space facilitates interaction of the users with the shared game space and/or each other by performing operations in the shared game space in response to commands received from the users, wherein a first user is associated with a first user grouping comprising a plurality of users;

determining gameplay metric values of a gameplay metric for the users, wherein the gameplay metric values quantify achievement within the shared game space such that a first gameplay metric value determined for the first user quantifies achievement of the first user in the shared game space;

altering determinations of the gameplay metric values during an event time period to magnify changes to the gameplay metric values, wherein the determination of the gameplay metric values is altered to magnify the changes to the gameplay metric values such that the impact of achievement in the shared game space is magnified;

determining, based on increases in the gameplay metric values of the users during the event time period, a ranking of the first user grouping; and determine, based on the ranking of the first user grouping, awards to be provided to the individual users of the first user grouping, wherein the awards include virtual items to be distributed for use in the shared game space such that a first award is determined to be provided to a first user based on the ranking of the first user grouping during the event time period.

10. The method of claim 9, wherein the determination of the gameplay metric is reverted to its unaltered state after the event period.

11. The method of claim 9, wherein the gameplay metric includes a type of measurement of a type of action in the shared game space and/or a measure of progression, and wherein the gameplay metric values indicates value of the gameplay metric and includes a number of points relating to an achievement and/or the number of points accumulated by a user.

12. The method of claim 9, wherein during the event period, the determination of the gameplay metric values associated with achievements for a first user are altered to magnify the impact of the achievements such that the gameplay metric values are different than if the achievements occurred outside the event period.

13. The method of claim 9, wherein awards are determined for each of multiple categories of gameplay metric values to be distributed to the users with the greatest increase in each of the multiple categories of gameplay metric values.

14. The method of claim 9, wherein multiple awards are determined for a single category of gameplay metric values, and multiple users are provided awards based on their increase in the single category of gameplay metric values.

15. The method of claim 9, wherein the determination of the gameplay metric values of a first user are differentially altered responsive to the first user purchasing an in-game benefit.

16. The method of claim 9, further comprising distributing at least an award.

17. The system of claim 1, wherein the determination of the gameplay metric values is altered to magnify the changes to the gameplay metric values for a temporary period of time, and wherein the temporary period of time begins at a start of the event time period and ends at an end time of the event time period.

18. The system of claim 1, wherein the determination of the gameplay metric values is altered to magnify the changes to the gameplay metric values for a temporary period of time, and wherein the temporary period of time overlaps the event time period.

19. The method of claim 9, wherein the determination of the gameplay metric values is altered to magnify the changes to the gameplay metric values for a temporary period of time, and wherein the temporary period of time begins at a start of the event time period and ends at an end time of the event time period.

20. The method of claim 9, wherein the determination of the gameplay metric values is altered to magnify the changes to the gameplay metric values for a temporary period of time, and wherein the temporary period of time overlaps the event time period.

* * * * *